United States Patent
Asvadi et al.

(10) Patent No.: US 12,533,035 B2
(45) Date of Patent: Jan. 27, 2026

(54) APPARATUS AND METHOD AND COMPUTER PROGRAM PRODUCT FOR DETERMINING A BLOOD PRESSURE MEASUREMENT

(71) Applicant: KONINKLIJKE PHILIPS N.V., Eindhoven (NL)

(72) Inventors: Sima Asvadi, Eindhoven (NL); Cristian Nicolae Presura, Veldhoven (NL); Alina Milici, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1106 days.

(21) Appl. No.: 17/054,052

(22) PCT Filed: May 7, 2019

(86) PCT No.: PCT/EP2019/061724
§ 371 (c)(1),
(2) Date: Nov. 9, 2020

(87) PCT Pub. No.: WO2019/215181
PCT Pub. Date: Nov. 14, 2019

(65) Prior Publication Data
US 2021/0244297 A1    Aug. 12, 2021

(30) Foreign Application Priority Data
May 8, 2018   (EP) .................................... 18171142

(51) Int. Cl.
*A61B 5/021*   (2006.01)
*A61B 5/00*    (2006.01)
*A61B 5/022*   (2006.01)

(52) U.S. Cl.
CPC .......... *A61B 5/02116* (2013.01); *A61B 5/022* (2013.01); *A61B 5/681* (2013.01); *A61B 5/6843* (2013.01); *A61B 2560/0209* (2013.01)

(58) Field of Classification Search
CPC .......... A61B 2560/0209; A61B 5/6843; A61B 5/681; A61B 5/022; A61B 5/02116
See application file for complete search history.

(56) References Cited

U.S. PATENT DOCUMENTS

| 4,137,907 A | * | 2/1979 | Jansen | ................. A61B 5/7242 |
| | | | | 600/494 |
| 4,796,636 A | * | 1/1989 | Branstetter | ........ A61B 5/14551 |
| | | | | 356/42 |

(Continued)

FOREIGN PATENT DOCUMENTS

| JP | 5038988 U | 4/1975 |
| JP | 2005131356 A | 5/2005 |
| WO | 2017152098 A1 | 9/2017 |

OTHER PUBLICATIONS

International Search Report and Written Opinion, International Application No. PCT/EP2019/061724, Mailed on Aug. 6, 2019.

(Continued)

*Primary Examiner* — Christopher Koharski
*Assistant Examiner* — Helene Bor (57) ABSTRACT

There is provided an apparatus (100) for determining a blood pressure measurement for a subject (102). The apparatus (100) comprises a processor (104) configured to acquire, from a light sensor (106), measurements of an intensity of light (108) of a first wavelength range reflected from the skin (110) of the subject (102) for a range of forces at which the light sensor (106) is applied to the skin. The processor (104) is further configured to determine a pulse amplitude from the measurements of light intensity at the range of applied forces and analyze the determined pulse (Continued)

amplitudes to determine a systolic blood pressure measurement based on the applied force at which the pulse amplitude drops below a predefined threshold and/or an integral of the pulse amplitudes and/or a diastolic blood pressure measurement based on the applied force at which an initial rise in the pulse amplitude is identified.

20 Claims, 6 Drawing Sheets (56) References Cited

U.S. PATENT DOCUMENTS

| | | | | |
|---|---|---|---|---|
| 6,190,325 | B1* | 2/2001 | Narimatsu | A61B 5/0225 600/490 |
| 7,184,809 | B1* | 2/2007 | Sterling | A61B 5/14551 600/323 |
| 7,324,848 | B1* | 1/2008 | Turcott | A61B 5/14551 607/9 |
| 8,948,832 | B2* | 2/2015 | Hong | A61B 5/1118 600/301 |
| 10,813,561 | B2 | 10/2020 | Kwon | |
| 2001/0037068 | A1* | 11/2001 | Goto | A61B 5/02116 600/494 |
| 2002/0026121 | A1* | 2/2002 | Kan | A61B 5/02255 600/500 |
| 2010/0210956 | A1* | 8/2010 | Im | A61B 5/022 600/490 |
| 2016/0015301 | A1 | 1/2016 | Elliott | |
| 2017/0224226 | A1* | 8/2017 | Kitagawa | A61B 5/022 |
| 2017/0251935 | A1* | 9/2017 | Yuen | A61B 5/7278 |
| 2017/0367592 | A1* | 12/2017 | Maltz | A61B 8/06 |
| 2021/0244297 | A1 | 8/2021 | Asvadi | |

OTHER PUBLICATIONS

Dassel, A. et al., "Reflectance pulse oximetry at the forehead improves by pressure on the probe", Journal of Clinical Monitoring, vol. 11, No. 4, Jul. 1995.

Teng, X. et al., "The effect of contacting force on photoplethysmographic signals; the effect of contacting force on photoplethysmographic signals", Physiological Measurement, vo.. 25, No. 5, Oct. 2004.

Blaxter, L. et al., "An automated quasi-continuous capillary refill timing device", Physiological Measurement, Institute of Physics Publishing, Bristol GB, vol. 37, No. 1, Dec. 2015.

Chandrasekhar, A. et al., "Smartphone-based blood pressure monitoring via the oscillometric finger-pressing method", Science Translational Medicine, vol. 10, No. 431, Mar. 2018.

Nitzan, M. et al., "Automatic noninvasive measurement of systolic blood pressure using photoplethysmography", BioMedical Engineering Online, 2009.

Grabovskis, A. et al., "Photoplethysmography system for blood pulsation detection in unloaded artery conditions", Proceeding SPIE 7513, 2009 International Conference on Optical Instruments and Technology, Apr. 2012.

Finapres Medical Systems: Non-Invasive Hemodynamics, Copyright 2012, The Netherlands, http://www.finapres.com/Products/Finpares-NOVA-Technology.

* cited by examiner

APPARATUS AND METHOD AND COMPUTER PROGRAM PRODUCT FOR DETERMINING A BLOOD PRESSURE MEASUREMENT

This application is the U.S. National Phase application under 35 U.S.C. § 371 of International Application No. PCT/EP2019/061724, filed on 7 May 2019, which claims the benefit of European Application Serial No. 18171142.5, filed 8 May 2018. These applications are hereby incorporated by reference herein.

FIELD OF THE INVENTION

The disclosure relates to an apparatus and method for determining a blood pressure measurement for a subject.

BACKGROUND OF THE INVENTION

Blood pressure is considered to be one of the most important physiological parameters for monitoring subjects. This is especially the case for subjects in a critical condition. Blood pressure can, for example, provide a useful indication of the physical or physiological condition of a subject. A variety of techniques exist for measuring blood pressure. The techniques can be divided into two categories, namely invasive techniques and non-invasive techniques. Most invasive techniques are expensive and are generally only used in hospitals (especially in intensive care units) as they require specialists for operation. Therefore, non-invasive techniques can be more practical where blood pressure measurements need to be acquired more frequently by an untrained user.

The most common non-invasive technique for measuring the blood pressure of a subject is with the aid of a wearable cuff on the finger, wrist or upper arm of the subject, which is inflated above the systolic blood pressure. The non-invasive techniques require the wearable cuff to be inflated and then the blood pressure measurement is determined based on changes in sound, pressure and optics upon deflation of the wearable cuff. An example of such a technique involves inflating a wearable cuff around a finger of the subject and monitoring a single infrared photoplethysmogram (PPG) signal. In a variation of this technique, an air pressure signal may instead be monitored. The signal that is monitored in these techniques is then used to determine a blood pressure measurement. Other non-invasive techniques for measuring the blood pressure of a subject do not require the use of a wearable cuff. An example of such a non-invasive technique involves measuring a pulse wave velocity (PWV), which is the speed at which blood passes over several locations of the circulatory system of the body of the subject, and measuring a pulse transit time delay, which is based on a correlation between electrical signals, such as electrocardiogram (ECG) signals, and optical signals, such as photoplethysmogram (PPG) signals.

There also exist non-invasive techniques that use a spectral measurement of the skin/tissue combined with applied pressure. JP 2005/131356 discloses an example of a blood pressure measuring device that uses such a technique. The device has a body installed on the skin of a subject, where the body has two light emitting elements for irradiating light having a predetermined wavelength toward an artery in the skin of the subject, two light receiving elements for receiving a pulse wave generated by reflected light in the downstream side of the device, and a pressure pulse wave sensor pressing the skin of the subject so that pressure can be varied. A maximum blood pressure value is determined on the basis of the fact that signal intensity detected by the light receiving elements exceeds a predetermined criterion value by continuously reducing pressing force of the pressure pulse wave sensor from pressure higher than the maximum blood pressure value.

However, it is challenging to measure blood pressure continuously using a non-invasive technique and, at present, there is no device with proven accuracy and reliability that can measure blood pressure in a continuous and non-invasive way.

SUMMARY OF THE INVENTION

As noted above, a limitation with existing apparatus and methods for determining a blood pressure measurement for a subject is that they are not able to accurately and reliably measure blood pressure in a continuous and non-invasive way. It would thus be valuable to have an improved apparatus and method for determining a blood pressure measurement for a subject, which addresses the existing problems.

Therefore, according to a first aspect, there is provided an apparatus for determining a blood pressure measurement for a subject. The apparatus comprises a processor configured to acquire, from a light sensor, measurements of an intensity of light of a first wavelength range reflected from the skin of the subject for a range of forces at which the light sensor is applied to the skin of the subject. The processor is also configured to determine a pulse amplitude from the measurements of light intensity at the range of applied forces and analyze the determined pulse amplitudes to determine a systolic blood pressure measurement based on the applied force at which the determined pulse amplitude drops below a predefined threshold and an integral of the determined pulse amplitudes and/or a diastolic blood pressure measurement based on the applied force at which an initial rise in the determined pulse amplitude is identified.

In some embodiments, the acquired measurements may comprise measurements of an alternating current component and a direct current component of the intensity of light of the first wavelength range reflected from the skin of the subject and the processor may be configured to determine the pulse amplitude as the ratio of the measurements of the alternating current component and the direct current component.

In some embodiments, the first wavelength range may be a green wavelength range.

In some embodiments, the processor may be further configured to plot the determined pulse amplitude as a function of the range of forces at which the light sensor is applied to the skin of the subject and analyze the plot to determine the systolic blood pressure measurement based on the applied force at which the determined pulse amplitude drops below a predefined threshold and the integral of the determined pulse amplitudes and/or the diastolic blood pressure measurement based on the applied force at which the initial rise in the determined pulse amplitude is identified.

In some embodiments, the processor may be further configured to acquire, from the light sensor, measurements of an intensity of light of a second wavelength range reflected from the skin of the subject for the range of forces at which the light sensor is applied to the skin of the subject. In these embodiments, the processor may also be configured to normalize the acquired measurements of the intensity of light of the first wavelength range using the intensity of light of the second wavelength range and determine the pulse amplitude from the normalized measurements of light intensity at the range of applied forces.

In some embodiments, the second wavelength range may be different to the first wavelength range. In some embodiments, the second wavelength range may be a red wavelength range or an infrared wavelength range.

According to a second aspect, there is provided a system comprising the apparatus as described above and the light sensor. The light sensor is configured to acquire the measurements of the intensity of light of the first wavelength range reflected from the skin of the subject for the range of forces at which the light sensor is applied to the skin of the subject.

In some embodiments, the system may comprise the apparatus described above and the light sensor may be further configured to acquire the measurements of the intensity of light of the second wavelength range reflected from the skin of the subject for the range of forces at which the light sensor is applied to the skin of the subject.

In some embodiments, the system may further comprise a light source configured to emit light of the first wavelength range at the skin of the subject. In some embodiments, the light source may be further configured to emit light of the second wavelength range at the skin of the subject.

In some embodiments, the system may further comprise a force sensor configured to measure the range of forces at which the light sensor is applied to the skin of the subject.

In some embodiments, the system may further comprise an optical head contactable with the skin of the subject. In some embodiments, the optical head may comprise the light sensor.

According to a third aspect, there is provided a method for determining a blood pressure measurement for a subject. The method comprises acquiring, from a light sensor, measurements of an intensity of light of a first wavelength range reflected from the skin of the subject for a range of forces at which the light sensor is applied to the skin of the subject. The method also comprises determining a pulse amplitude from the measurements of light intensity at the range of applied forces and analyzing the determined pulse amplitudes to determine a systolic blood pressure measurement for the subject based on the applied force at which the determined pulse amplitude drops below a predefined threshold and an integral of the determined pulse amplitudes and/or a diastolic blood pressure measurement for the subject based on the applied force at which an initial rise in the determined pulse amplitude is identified.

According to a fourth aspect, there is provided a computer program product comprising a computer readable medium, the computer readable medium having computer readable code embodied therein, the computer readable code being configured such that, on execution by a suitable computer or processor, the computer or processor is caused to perform the method described above.

According to the aspects and embodiments described above, the limitations of existing systems are addressed. In particular, according to the above-described aspects and embodiments, it is possible to accurately and reliably measure blood pressure in a continuous and non-invasive way. This is possible by relying on the applied force and taking advantage of the fact that the applied force is known. In this way, according to the above-described aspects and embodiments, not only the optical properties of blood can be measured (such as in the pulse wave velocity technique), but it is also possible to measure the mechanical properties of the blood, as blood pressure is ultimately a mechanical property, and also the heart rate of the subject. The above-described aspects and embodiments are also more comfortable for the subject than the existing techniques that require a wearable cuff to be inflated around a part of the body of the subject. There is thus provided an improved apparatus and method for determining a blood pressure measurement for a subject that overcome the existing problems.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

As noted above, there is provided herein an improved apparatus and method for determining a blood pressure measurement for a subject, which overcomes existing problems. The subject referred to herein can, for example, be a patient or any other subject.

Figure 1:
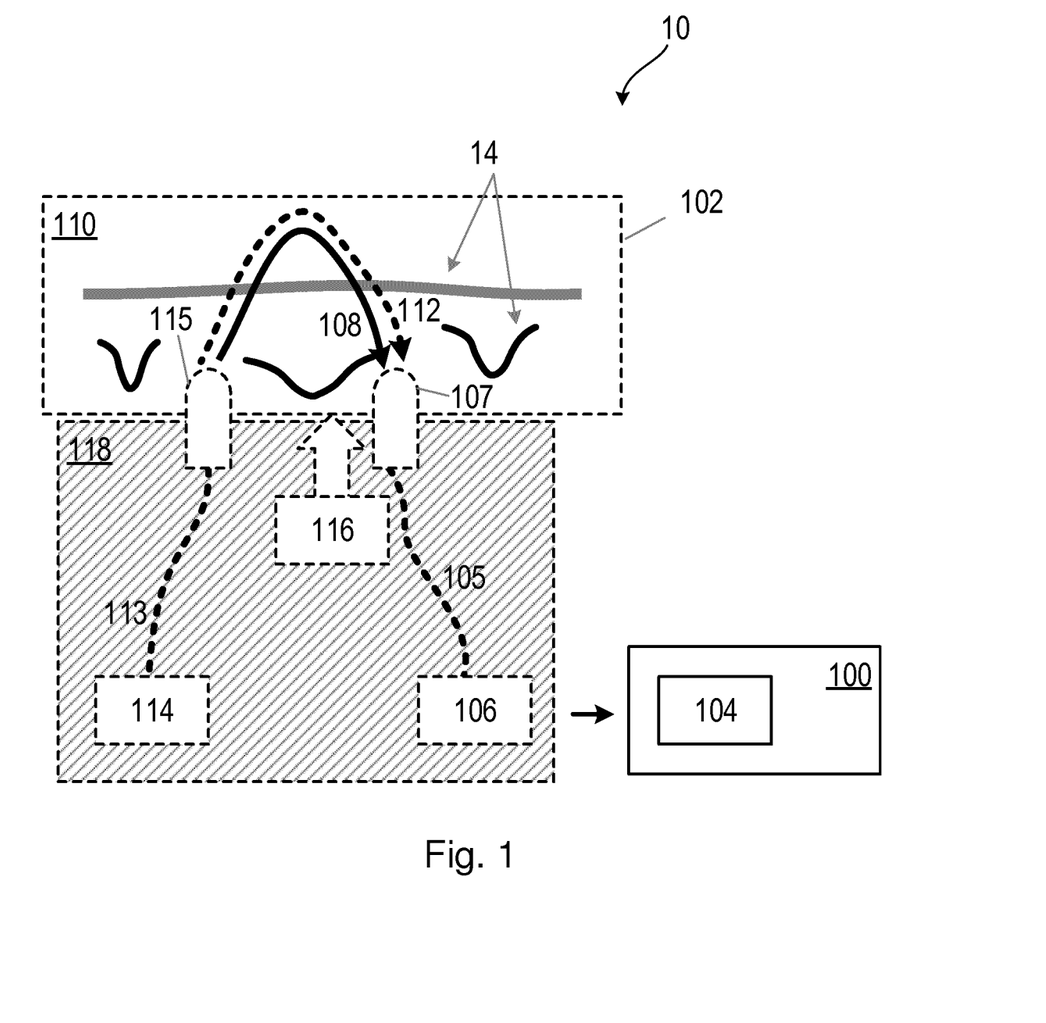
FIG. 1 is a schematic illustration of an apparatus for determining a blood pressure measurement for a subject in use in a system according to an embodiment.
Figure 2:
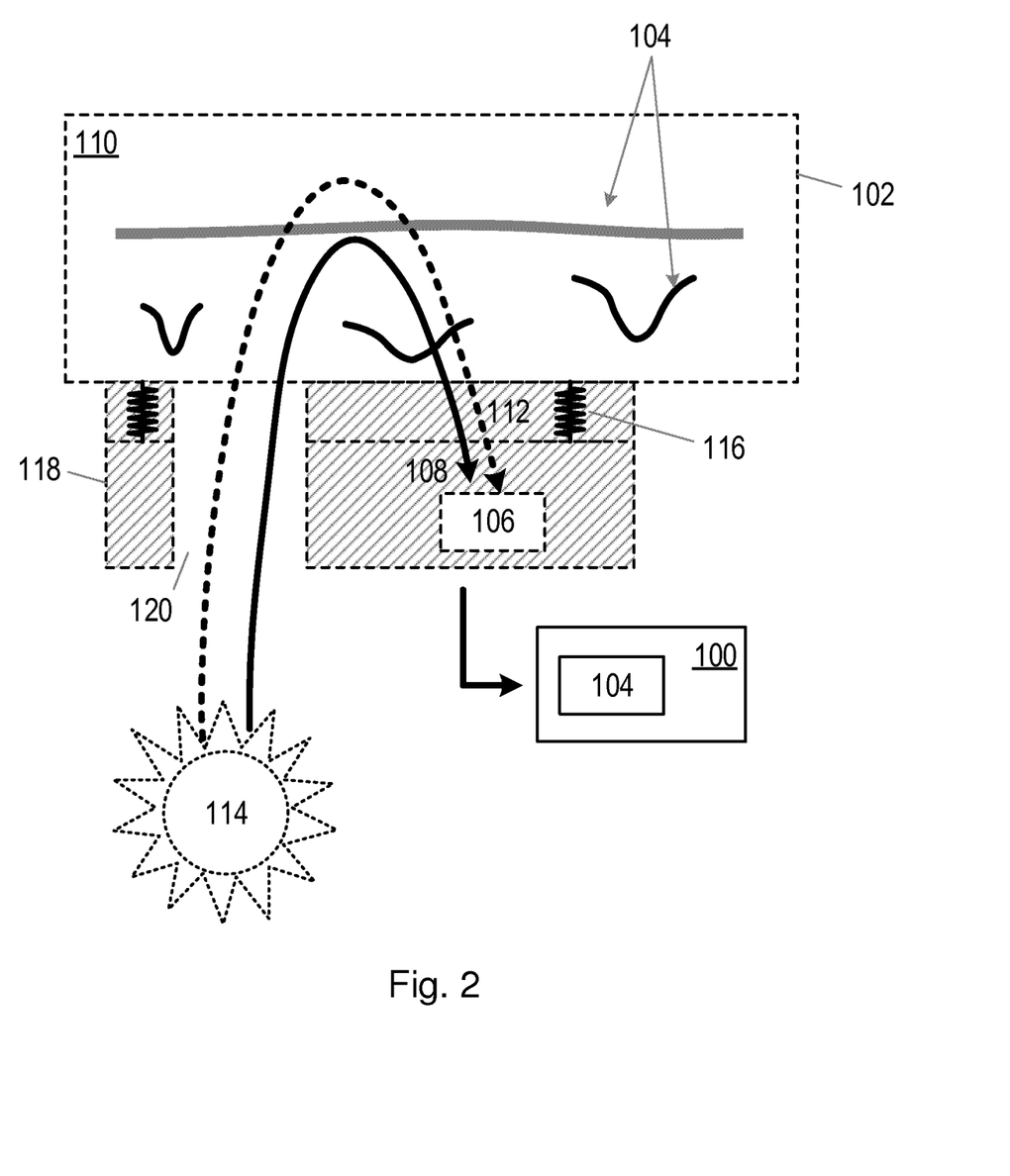
FIG. 2 is a schematic illustration of an apparatus for determining a blood pressure measurement for a subject in use in a system according to another embodiment.

FIGS. 1 and 2 illustrate an apparatus 100 for determining a blood pressure measurement for a subject 102 according to an embodiment. As illustrated in FIGS. 1 and 2, the apparatus 100 comprises a processor 104. Briefly, the processor 104 of the apparatus 100 is configured to acquire, from a light sensor (or light detector) 106, measurements of an intensity of light 108 of a first wavelength range reflected from the skin 110 of the subject 102 for a range of forces at which the light sensor 106 is applied to the skin 110 of the subject 102.

The light sensor 106 may form a part of a load unit (not shown), wherein said load unit can be arranged to apply a predefined force within the range of forces to the subject. The load unit may be further coupled to the processor 104, which can be arranged to receive data of the applied force and also control the applied by the load unit (or light sensor 106) force. In other words, the processor 104 can be arranged to acquire from the light sensor measurements of an intensity of light and receive readings from the load unit (or the sensor 106) on the range of forces at which the light sensor is applied to the skin of the subject. In some embodiments, the load unit may comprise a mechanical actuator, e.g. a direct current (DC) linear actuator or any other mechanical actuator. However, although an example has been provided for the load unit, a person skilled in the art will be aware of other examples and also the manner in which a load unit may operate to apply a predefined force within the range of forces to the subject.

In more detail, light 108 of the first wavelength range that enters the skin 110 of the subject 102 is reflected from one or more cells (e.g. blood cells) in the skin 110 of the subject 102. For example, as illustrated in FIGS. 1 and 2, the light 108 of the first wavelength range may be reflected from one or more blood vessels 14 in the skin 110 of the subject 102. In effect, the light 108 of the first wavelength range can be reflected by the skin 110 and the blood containing tissue under the skin 110.

The processor 104 of the apparatus 100 is configured to determine a pulse amplitude from the measurements of light intensity at the range of applied forces. Herein, the pulse amplitude is defined as the amplitude of the pulse of the subject 102. The pulse amplitude may also be referred to as the "modulation amplitude" or the "pulse modulation (PM)". The processor 104 of the apparatus 100 is also configured to analyze the determined pulse amplitudes to determine any one or more of a systolic blood pressure measurement for the subject 102 and a diastolic blood pressure measurement for the subject 102. The processor 104 of the apparatus 100 is configured to analyze the determined pulse amplitudes to determine the systolic blood pressure measurement for the subject 102 based on the applied force at which the determined pulse amplitude drops below a predefined threshold, an integral of the determined pulse amplitudes, or both the applied force at which the determined pulse amplitude drops below the predefined threshold and the integral of the determined pulse amplitudes. The processor 104 of the apparatus 100 is configured to analyze the determined pulse amplitudes to determine the diastolic blood pressure measurement for the subject 102 based on the applied force at which an initial rise in the determined pulse amplitude is identified.

The processor 104 of the apparatus 100 can be implemented in numerous ways, with software and/or hardware, to perform the various functions described herein. In some embodiments, the processor 104 may comprise one or more processors, which can each be configured to perform individual or multiple steps of the method described herein. In particular implementations, the processor 104 can comprise a plurality of software and/or hardware modules, each configured to perform, or that are for performing, individual or multiple steps of the method described herein. The processor 104 may comprise one or more microprocessors, one or more multi-core processors and/or one or more digital signal processors (DSPs), one or more processing units, and/or one or more controllers (such as one or more microcontrollers) that may be configured or programmed (e.g. using software or computer program code) to perform the various functions described herein. The processor 104 may be implemented as a combination of dedicated hardware (e.g. amplifiers, pre-amplifiers, analog-to-digital convertors (ADCs) and/or digital-to-analog convertors (DACs)) to perform some functions and one or more processors (e.g. one or more programmed microprocessors, DSPs and associated circuitry) to perform other functions.

There is also provided a system for determining a blood pressure measurement for a subject 102. As illustrated in FIGS. 1 and 2, the system 10, 20 can comprise the apparatus 100 that is described herein. The system 10, 20 can also comprise the light sensor 106. Although not illustrated in FIG. 1 or 2, in some embodiments, the apparatus 100 itself may comprise the light sensor 106. In other embodiments, such as that illustrated in FIGS. 1 and 2, the light sensor 106 can instead be external to (i.e. separate to or remote from) the apparatus 100. For example, in some embodiments, the light sensor 106 may be a separate entity or part of another apparatus (e.g. a device). The light sensor 106 is configured for application to the skin 110 of the subject 102. The light sensor 106 may be applied directly to the skin 110 of the subject 102 or indirectly to the skin 110 of the subject 102 (e.g. via one or more other components, such as an optical fiber and/or an optical probe).

The light sensor 106 is configured to acquire the measurements of the intensity of light 108 of the first wavelength range reflected from the skin 110 of the subject 102 for the range of forces at which the light sensor 106 is applied to the skin 110 of the subject 102. Thus, the light sensor 106 can be sensitive to light 108 of the first wavelength range. In some embodiments, the first wavelength range can be a green wavelength range. Thus, the light 108 of the first wavelength range may comprise light 108 of a wavelength in a range from 495 nm to 570 nm according to some embodiments. The spectral response of the skin 110 exhibits large absorption in the green wavelength range. As such, the green wavelength range can provide optimal conditions for detecting variations in blood pressure.

In some embodiments, the light sensor 106 may be further configured to acquire measurements of the intensity of light 112 of a second wavelength range reflected from the skin 110 of the subject 102 for the range of forces at which the light sensor 106 is applied to the skin 110 of the subject 102. Thus, the light sensor 106 can be sensitive to light 112 of the second wavelength range. In some embodiments, the second wavelength range can be different to the first wavelength range. In some embodiments, the second wavelength range may be a red wavelength range. Thus, the light 112 of the second wavelength range may comprise light 112 of a wavelength in a range from 620 nm to 700 nm according to some embodiments. In other embodiments, the second wavelength range may be an infrared wavelength range. Thus, the light 112 of the second wavelength range may comprise light 112 of a wavelength in a range from 700 nm to 1 mm according to some embodiments.

In some embodiments, as illustrated in FIG. 1 and FIG. 2, the light sensor 106 may comprise a single light sensor 106. In some of these embodiments, a single light sensor 106 may be configured to acquire both the measurements of the intensity of light 108 of the first wavelength range reflected from the skin 110 of the subject 102 and the measurements of the intensity of light 112 of the second wavelength range reflected from the skin 110 of the subject 102. Thus, according to some embodiments, the light sensor 106 configured to acquire the measurements of the intensity of light 108 of the first wavelength range reflected from the skin 110 of the subject 102 may be the same light sensor 106 as that configured to acquire the measurements of the intensity of light 112 of the second wavelength range reflected from the skin 110 of the subject 102. For example, the light sensor 106 may be a multi-wavelength light sensor configured to acquire measurements of the intensity of light 108, 112 of at least two wavelength ranges reflected from the skin 110 of the subject 102.

In other embodiments, although not illustrated, the light sensor 106 may comprise at least two light sensors. In some of these embodiments, a light sensor other than the light sensor that is configured to acquire the measurements of the intensity of light 108 of the first wavelength range reflected from the skin 110 of the subject 102 may be configured to acquire the measurements of the intensity of light 112 of the second wavelength range reflected from the skin 110 of the subject 102. Thus, according to some embodiments, different light sensors may be configured to acquire the measurements of the intensity of light 108, 112 of the different wavelength ranges.

Examples of a light sensor 106 that may be used to acquire the measurements of the intensity of light 108 of the first wavelength range reflected from the skin 110 of the subject 102 and/or the measurements of the intensity of light 112 of the second wavelength range reflected from the skin 110 of the subject 102 include, but are not limited to a photodetector, a photodiode, a photomultiplier, or any other type of light sensor suitable to acquire measurements of the intensity of light 108, 112 of the first wavelength range and/or second wavelength range.

As illustrated in FIGS. 1 and 2, according to some embodiments, the system 10, 20 can comprise a light source 114. The light source 114 may be configured to emit light 108 of the first wavelength range at the skin 110 of the subject 102. That is, the light source 114 may be configured to emit the light 108 of the first wavelength range, which is subsequently reflected from the skin 110 of the subject 102. In some embodiments that involve light 112 of the second wavelength range, the light source 114 may be further configured to emit light 112 of the second wavelength range at the skin 110 of the subject 102. That is, the light source 114 may be configured to emit the light 112 of the second wavelength range, which is subsequently reflected from the skin 110 of the subject 102.

In some embodiments, the light source 114 may comprise a single light emitter that is configured to emit light 108, 112 of both the first wavelength range and the second wavelength range. In other embodiments, the light source 114 may comprise more than one light emitter, where at least one light emitter is configured to emit light 108 of the first wavelength range and at least one other light emitter is configured to emit light 112 of the second wavelength range. In some of these embodiments, the at least one light emitter configured to emit light 108 of the first wavelength range and the at least one other light emitter configured to emit light 112 of the second wavelength range may be pulsated. For example, the at least one light emitter configured to emit light 108 of the first wavelength range may be operable to emit light at a different time to the at least one other light emitter configured to emit light 112 of the second wavelength range. In these embodiments, the light sensor 106 may be configured to synchronize the light pulses of the first wavelength range and the second wavelength range reflected from the skin 110 of the subject 102. In this way, a lower power consumption can be achieved and it is also possible to use only a single light sensor 106. In other embodiments, a light source (not illustrated) other than the light source 114 that is configured to emit the light 108 of the first wavelength range may be configured to emit the light 112 of the second wavelength range. Thus, in some embodiments, different light sources may be configured to emit the light 108, 112 of the different wavelength ranges.

Examples of a light source 114 (or a light emitter of a light source 114) that may be used to emit the light 108 of the first wavelength range and/or the light 112 of the second wavelength range include, but are not limited to a natural or ambient light source (or light emitter), as the sun, or any other natural or ambient light source (or light emitter), an artificial light source (or light emitter), such as a broadband light source (or light emitter), a light emitting diode (LED), a halogen lamp, an incandescent light bulb, or any other artificial light source (or light emitter), or any other light source (or light emitter), or any combination of light sources (or light emitters), suitable to emit light 108, 112 of the first wavelength range and/or second wavelength range. A natural or ambient light source (or light emitter) may be used to provide a less complex system and to ensure that less power is consumed. FIG. 1 illustrates a system 10 comprising an artificial light source 114, whereas FIG. 2 illustrates a system 20 comprising a natural light source 114. In some embodiments, the light source 114 (or light emitter of the light source 114) may be configured to emit white light comprising the light 108 of the first wavelength range and/or the light 112 of the second wavelength range. In other embodiments, the light source 114 (or light emitter of the light source 114) may be configured to emit only the light 108 of the first wavelength range and/or the light 112 of the second wavelength range, in the absence of light of any other wavelength ranges.

In some embodiments, such as that illustrated in FIG. 1, the light source 114 may be configured to emit light 108 of the first wavelength range and/or the light 112 of the second wavelength range via a first optical fiber 113 and a first optical probe 115. In these embodiments, the first optical probe 115 may be contactable with the skin 110 of the subject 102. Thus, in some embodiments, the first optical fiber 113 can be configured to transfer light 108 of the first wavelength range and/or the light 112 of the second wavelength range emitted by the light source 114 to the skin 110 of the subject 102, e.g. via the first optical probe 115.

Similarly, in some embodiments, such as that illustrated in FIG. 1, the light sensor 106 may be configured to acquire the measurements of the intensity of light 108 of the first wavelength range and/or the light 112 of the second wavelength range via a second optical fiber 105 and a second probe 107. In these embodiments, the second optical probe 107 may be contactable with the skin 110 of the subject 102. Thus, the light sensor 106 according to these embodiments is applied indirectly to the skin 110 of the subject 102 via the second optical fiber 105 and a second probe 107. The second optical fiber 105 can be configured to transfer light 108 of the first wavelength range and/or the light 112 of the second wavelength range reflected from the skin 110 of the subject 102 to the light sensor 106, e.g. via the second optical probe 107.

In some embodiments, a distance between the light sensor 106 and the light source 114 may be a distance in a range from 1 to 10 mm, for example in a range from 1.5 to 9.5 mm, for example in a range from 2 to 9, for example in a range from 1.5 to 8.5 mm, for example in a range from 2 to 8 mm, for example in a range from 2.5 to 7.5 mm, for example in a range from 3 to 7 mm, for example in a range from 3.5 to 6.5 mm, for example in a range from 4 to 6 mm, for example in a range from 4.5 to 5.5 mm. For example, in some embodiments, the distance between the light sensor 106 and the light source 114 may be a distance selected from 1 mm, 2 mm, 3 mm, 4 mm, 5 mm, 6 mm, 7 mm, 8 mm, 9 mm, 10 mm, or any non-integer distance between those values, or any other distance that is in the range from 1 to 10 mm. A distance between the light sensor 106 and the light source 114 that is less than or equal to 10 mm can ensure that the light reaching the light sensor 106 from the light source 114 has an intensity that is high enough for measurements of the intensity of light to be acquired, while a distance between the light sensor 106 and the light source 114 that is greater than or equal to 1 mm can ensure that the light emitted by the light source 114 penetrates the skin 110 of the subject 102 deep enough to obtain a reliable signal from larger blood vessels.

As illustrated in FIG. 1 and FIG. 2, according to some embodiments, the system 10, 20 may comprise a force sensor 116. The force sensor 116 can be configured (or arranged) to measure the range of forces at which the light sensor 106 is applied to the skin 110 of the subject 102. Examples of a force sensor 116 that may be used to measure the range of forces at which the light sensor 106 is applied to the skin 110 of the subject 102 include, but are not limited to a pressure sensor, a capacitive sensor, a magnetic sensor, or any other type of force sensor suitable to measure the range of forces at which the light sensor 106 is applied to the skin 110 of the subject 102. In some embodiments, the force sensor 116 can be arranged to measure the range of forces at which the light sensor 106 is applied to the skin 110 of the subject 102 by detecting a range of contact pressures at which the light sensor 106 is applied to the skin 110 of the subject 102.

In some embodiments, as illustrated in FIG. 1 and FIG. 2, the system 10, 20 can comprise an optical head 118. The optical head 118 may be contactable with the skin 110 of the subject 102. In some embodiments, a device may comprise any one or more of the optical head 118, the light source 114, the first optical fiber 113, the first optical probe 115, the light sensor 106, the second optical fiber 105, the second optical probe 107, and the force sensor 116. In some embodiments where the system 10, 20 comprises an optical head 118, the optical head 118 can comprise any one or more of the light source 114, the first optical fiber 113, the first optical probe 115, the light sensor 106, the second optical fiber 105, the second optical probe 107, and the force sensor 116. In embodiments where the system 20 comprises a natural light source 114, such as that illustrated in FIG. 2, the optical head 118 can comprise an aperture or transparent window 120 through which light emitted from the light source 114 can pass to the skin 110 of the subject 102. The optical head 118 can minimize the effect of the interference from the environment on the measurements of the intensity of light. Examples of interference can, for example, include ambient light in the case of an artificial light source embodiments, air, or any other interference from the environment that may affect the measurements of the intensity of light.

As mentioned earlier, the optical head 118 is contactable with the skin 110 of the subject 102. In some embodiments, for example, the optical head 118 may be secured to or held in place on the skin 110 on a part of the body of the subject 102 in use. For example, in some embodiments, a surface of the optical head 118 may comprise an adhesive to secure or hold in place the optical head 118 to the skin 110 on a part of the body of the subject 102. In other embodiments, a band (or strap) 122 may comprise the optical head 118. The band 122 can be configured to be worn around (e.g. attached on) a part of the body of the subject 102 to secure or hold in place the optical head 118 on the skin 110 on the part of the body of the subject 102. For example, in some embodiments, the optical head 118 can be integrated into the band 122. In other embodiments, the optical head 118 may be placed under the band 122. Thus, the optical head 118 can be integrated into or placed under any object that is contactable with the skin 110 of the subject 102, such as a watch, a smartwatch, a headband, or any other object contactable with the skin 110 of the subject 102.

The optical head 118 may be secured to or held in place on the skin 110 on any part of the body of the subject 102. For example, in some embodiments, the part of the body of the subject 102 may be a peripheral site of the body of the subject 102, such as a wrist of the subject 102, a forearm of the subject 102, or any other peripheral site of the subject. In other embodiments, the part of the body of the subject 102 may be a central site of the body of the subject 102, such as the head (e.g. the forehead) of the subject 102, the chest of the subject 102, or any other central part of the body of the subject 102. A central site of the body of the subject 102 can, for example, provide more stable measurements of the intensity of light than a peripheral site of the body of the subject 102. In some embodiments, the part of the body of the subject 102 may be a part of the body of the subject 102 comprising a boney structure. In this way, the optical head 118 may be better supported when secured to or held in place on the skin 110 on the part of the body of the subject 102. Also, complex skin deformations can be avoided and the measurements of the light intensity can be more accurate since there is less interference from the optical response of soft tissue, such as tendons, muscles, fat, or similar.

Figure 3:
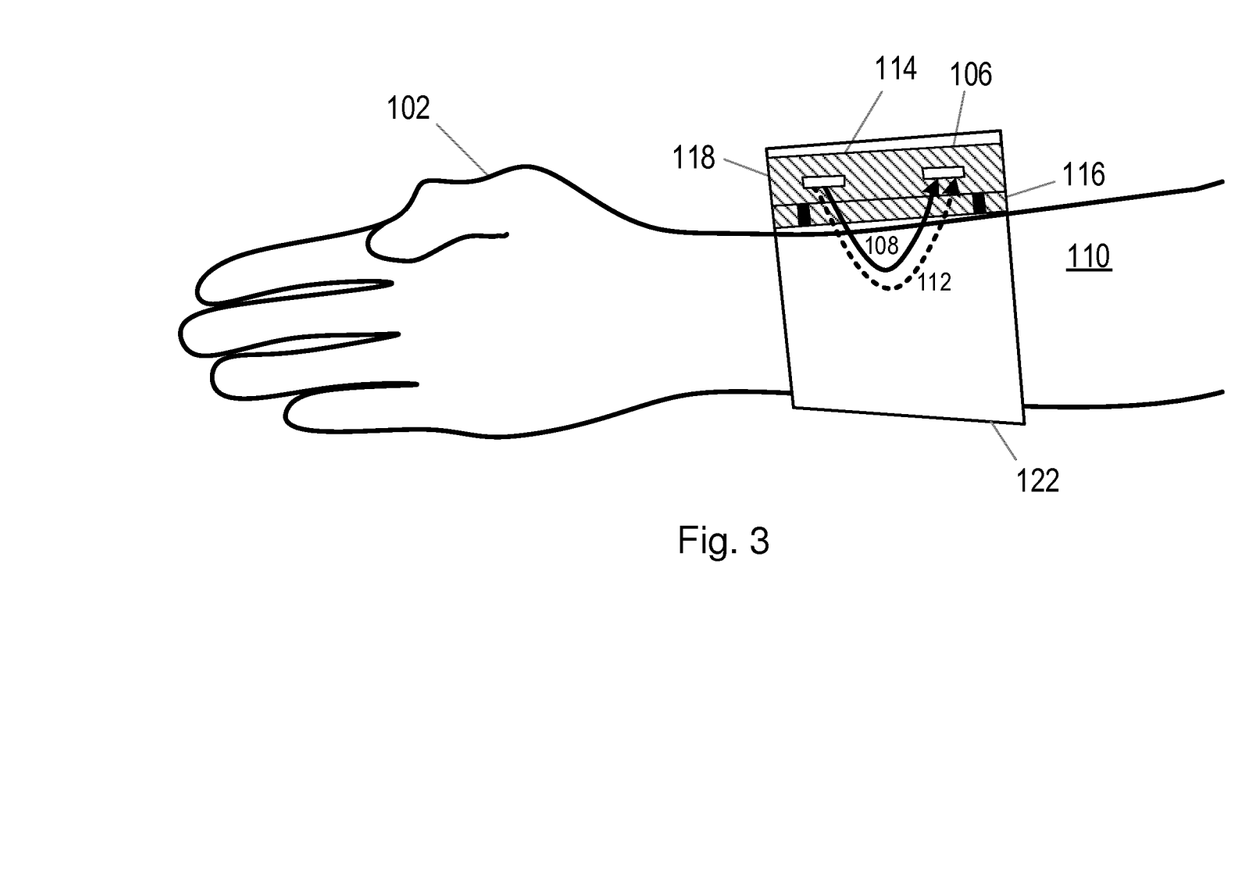
FIG. 3 is a schematic illustration of a system in use for determining a blood pressure measurement for a subject according to an embodiment.

FIG. 3 illustrates an example optical head 118 in use according to an embodiment. The example optical head 118 comprises the light source 114 configured to emit the light 108 of the first wavelength range (and, optionally, also the light 112 of the second wavelength range) at the skin 110 of the subject 102. The example optical head 118 also comprises the light detector 106 configured to acquire measurements of the intensity of light 108 of the first wavelength range (and, optionally, also the light 112 of the second wavelength range) reflected from the skin 110 of the subject 102 for the range of forces at which the light sensor 106 is applied to the skin 110 of the subject 102. In the illustrated example embodiment of FIG. 3, a band (or strap) 122 comprises the optical head 118. The band 122 is configured to be worn around a part of the body of the subject 102 to secure or hold in place the optical head 118 on the skin 110 on the part of the body of the subject 102. In the illustrated example embodiment of FIG. 3, the part of the body of the subject is the forearm (or, more specifically, the wrist) of the subject 102. However, as mentioned earlier, the optical head 118 may be secured to or held in place on the skin 110 on any other part of the body of the subject 102 in any other way.

Although not illustrated in FIG. 1, 2 or 3, in some embodiments, the apparatus 100 may comprise a communications interface (or communications circuitry). Alternatively or in addition, the communications interface may be external to (e.g. separate to or remote from) the apparatus 100. In some embodiments, the optical head 118 or a device comprising the optical head 118 may comprise the communications interface. The communications interface can be for enabling the apparatus 100, or components of the apparatus 100, to communicate with and/or connect to one or more other components, such as any of those described herein. For example, the communications interface can be for enabling the processor 104 of the apparatus 100 to communicate with and/or connect to any one or more of the light source 114, the light detector 106, the force sensor 116, and/or any other components. The communications interface may enable the apparatus 100, or components of the apparatus 100, to communicate and/or connect in any suitable way. For example, the communications interface may enable the apparatus 100, or components of the apparatus 100, to communicate and/or connect wirelessly, via a wired connection, or via any other communication (or data transfer) mechanism. In some wireless embodiments, for example, the communications interface may enable the apparatus 100, or components of the apparatus 100, to use radio frequency (RF), Bluetooth, or any other wireless communication technology to communicate and/or connect.

Although also not illustrated in FIG. 1, 2 or 3, in some embodiments, the apparatus 100 may comprise a memory. Alternatively or in addition, the memory may be external to (e.g. separate to or remote from) the apparatus 100. In some embodiments, the optical head 118 or a device comprising the optical head 118 may comprise the memory. The processor 104 of the apparatus 100 may be configured to communicate with and/or connect to the memory. The memory may comprise any type of non-transitory machine-readable medium, such as cache or system memory including volatile and non-volatile computer memory such as random access memory (RAM), static RAM (SRAM), dynamic RAM (DRAM), read-only memory (ROM), programmable ROM (PROM), erasable PROM (EPROM), and electrically erasable PROM (EEPROM). In some embodiments, the memory can be configured to store program code that can be executed by the processor 104 to cause the apparatus 100 to operate in the manner described herein.

Alternatively or in addition, in some embodiments, the memory can be configured to store information required by or resulting from the method described herein. For example, in some embodiments, the memory may be configured to store any one or more of the measurements of the intensity of light 108 of the first wavelength range reflected from the skin 110 of the subject 102, the measurements of the intensity of light 112 of the second wavelength range reflected from the skin 110 of the subject 102, the determined pulse amplitude, a determined systolic blood pressure measurement, a determined diastolic blood pressure measurement, or any other information, or any combination of information, required by or resulting from the method described herein. In some embodiments, the processor 104 of the apparatus 100 can be configured to control the memory to store information required by or resulting from the method described herein.

Although also not illustrated in FIG. 1, 2 or 3, in some embodiments, the apparatus 100 may comprise a user interface. Alternatively or in addition, the user interface may be external to (e.g. separate to or remote from) the apparatus 100. In some embodiments, the optical head 118 or a device comprising the optical head 118 may comprise the user interface. The processor 104 of the apparatus 100 may be configured to communicate with and/or connect to a user interface. The user interface can be configured to render (e.g. output, display, or provide) information required by or resulting from the method described herein. For example, in some embodiments, the user interface may be configured to render (e.g. output, display, or provide) any one or more of the measurements of the intensity of light 108 of the first wavelength range reflected from the skin 110 of the subject 102, the measurements of the intensity of light 112 of the second wavelength range reflected from the skin 110 of the subject 102, the determined pulse amplitude, a determined systolic blood pressure measurement, a determined diastolic blood pressure measurement, or any other information, or any combination of information, required by or resulting from the method described herein. Alternatively or in addition, the user interface can be configured to receive a user input. For example, the user interface may allow a user to manually enter information or instructions, interact with and/or control the apparatus 100. Thus, the user interface may be any user interface that enables the rendering (or outputting, displaying, or providing) of information and, alternatively or in addition, enables a user to provide a user input. In some embodiments, the processor 104 of the apparatus 100 can be configured to control the user interface to operate in the manner described herein.

For example, the user interface may comprise one or more switches, one or more buttons, a keypad, a keyboard, a mouse, a touch screen or an application (e.g. on a smart device such as a tablet, a smartphone, or any other smart device), a display or display screen, a graphical user interface (GUI) such as a touch screen, or any other visual component, one or more speakers, one or more microphones or any other audio component, one or more lights (such as light emitting diode LED lights), a component for providing tactile or haptic feedback (such as a vibration function, or any other tactile feedback component), an augmented reality device (such as augmented reality glasses, or any other augmented reality device), a smart device (such as a smart mirror, a tablet, a smart phone, a smart watch, or any other smart device), or any other user interface, or combination of user interfaces. In some embodiments, the user interface that is controlled to render information may be the same user interface as that which enables the user to provide a user input.

Figure 4:
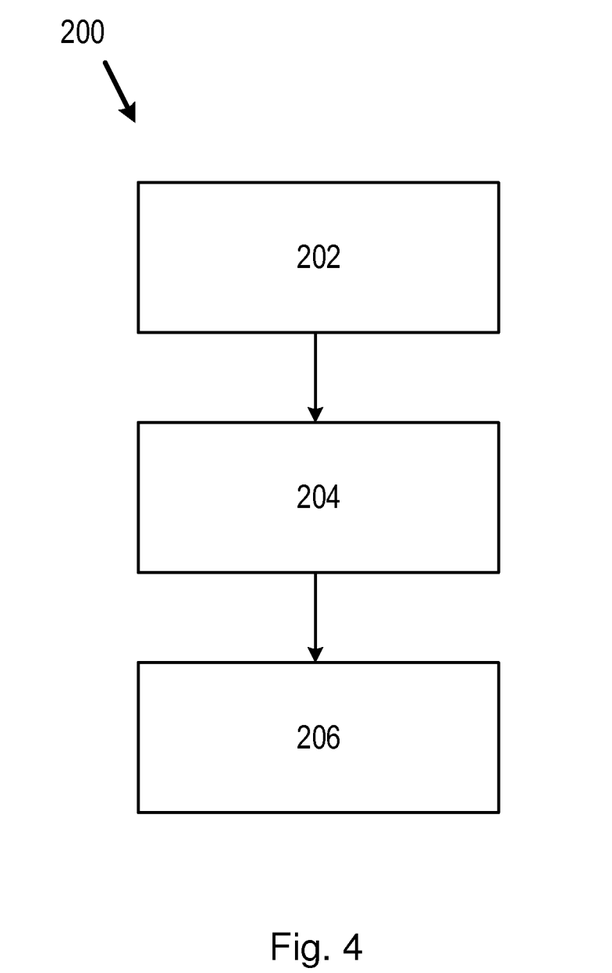
FIG. 4 is a flow chart illustrating a method for determining a blood pressure measurement for a subject according to an embodiment.

FIG. 4 illustrates a method 200 for determining a blood pressure measurement for a subject 102 according to an embodiment. The method 200 may generally be performed by or under the control of the processor 104 of the apparatus 100. At block 202 of FIG. 4, measurements of an intensity of light 108 of the first wavelength range reflected from the skin 110 of the subject 102 are acquired, from the light sensor 106, for the range of forces at which the light sensor 106 is applied to the skin 110 of the subject 102. The intensity of light 108 of the first wavelength range changes as a function of the force at which the light sensor 106 is applied to the skin 110 of the subject 102. Thus, the intensity of light 108 of the first wavelength range is dependent on the force at which the light sensor 106 is applied to the skin 110 of the subject 102.

The area on which the force is applied to the skin 110 of the subject 102 may be a circular shape or any other shape. The area may be determined by calibration. The area can thus be a predefined area. The predefined area may be set to be large enough to ensure comfort for the subject 102 and small enough to avoid non-uniformities of the skin 110 of the subject 102. In some embodiments, the predefined area may be an area in a range from 0.1 to 2 $cm^2$, for example an area in a range from 0.2 to 1.9 $cm^2$, for example an area in a range from 0.3 to 1.8 $cm^2$, for example an area in a range from 0.4 to 1.7 $cm^2$, for example an area in a range from 0.5 to 1.6 $cm^2$, for example an area in a range from 0.6 to 1.5 $cm^2$, for example an area in a range from 0.7 to 1.4 $cm^2$, for example an area in a range from 0.8 to 1.3 $cm^2$, for example an area in a range from 0.9 to 1.2 $cm^2$, for example an area in a range from 1 to 1.1 $cm^2$.

In some embodiments, the acquired measurements of light intensity can comprise measurements of an alternating current (AC) component of the intensity of light 108 of the first wavelength range reflected from the skin 110 of the subject 102. The measurements of the alternating current (AC) component of the intensity of light 108 of the first wavelength range reflected from the skin 110 of the subject 102 can be representative of pulse variations of the subject 102 that are embedded in the acquired measurements of light intensity. The alternating current (AC) component of the intensity of light 108 of the first wavelength range reflected from the skin 110 of the subject 102 decreases as the force at which the light sensor 106 is applied to the skin 110 of the subject 102 increases. This is in contrast to the direct current (DC) component of the intensity of light 108 of the first wavelength range reflected from the skin 110 of the subject 102, which increases as the force at which the light sensor 106 is applied to the skin 110 of the subject 102 increases. In some embodiments, the acquired measurements of light intensity can comprise measurements of an alternating current (AC) component and a direct current (DC) component of the intensity of light 108 of the first wavelength range reflected from the skin 110 of the subject 102.

At block 204 of FIG. 4, a pulse amplitude is determined from the measurements of light intensity at the range of applied forces. In some embodiments, the range of applied forces may be a range from 0.1 to 5 N, for example a range from 0.4 to 4.7 N, for example a range from 0.7 to 4.4 N, for example a range from 1 to 4.1 N, for example a range from 1.3 to 3.8 N, for example a range from 1.6 to 3.5 N, for example a range from 1.9 to 3.2 N, for example a range from 2.2 to 2.9 N, for example a range from 2.5 N to 2.6 N. The range of forces may be determined by calibration.

In some embodiments, range of applied forces may be determined based on a blood pressure of the subject 102 (e.g. measured during a calibration phase) and the area on which the force is applied to the skin 110 of the subject 102. More specifically, an applied force can be determined by multiplying a value of the blood pressure of the subject 102 with the area on which the force is applied to the skin 110 of the subject 102. Thus, a minimum applied force for the range of applied forces may be determined by multiplying a lower value of the blood pressure of the subject 102 (e.g. measured during a calibration phase) with the area on which the force is applied to the skin 110 of the subject 102. For example, if the area is 1 cm² and the lower value of the blood pressure of the subject 102 is 20 mmHg, then the minimum applied force is determined as (20 mmHg)*(1 cm²), which is equivalent to approximately 0.26 N. Similarly, a maximum applied force for the range of applied forces may be determined by multiplying a higher value of the blood pressure of the subject 102 (e.g. measured during a calibration phase) with the area on which the force is applied to the skin 110 of the subject 102. For example, if the area is 1 cm² and the higher value of the blood pressure of the subject 102 is 200 mmHg, then the maximum applied force is determined as (200 mmHg)*(1 cm²), which is equivalent to approximately 2.6 N. Thus, in this example, the range of applied forces is 0.26 to 2.6 N.

In some embodiments, the pulse amplitude may be determined by monitoring the acquired measurements of the intensity of light 108 of the first wavelength range reflected from the skin 110 of the subject 102 as a function of time. As mentioned earlier, the acquired measurements of light intensity can comprise measurements of an alternating current (AC) component and a direct current (DC) component of the intensity of light 108 of the first wavelength range reflected from the skin 110 of the subject 102 according to some embodiments. A direct current (DC) component is constant in time, whereas an alternating current (AC) component is variable in time (e.g. given by the beatings of the heart). In these embodiments, the processor 104 of the apparatus 100 can be configured to determine the pulse amplitude as the ratio of the measurements of the alternating current (AC) component and the direct current (DC) component. That is, the pulse amplitude may be calculated by dividing the alternating current (AC) component by the direct current (DC).

In some embodiments, the acquired measurements of the intensity of light 108 of the first wavelength range reflected from the skin 110 of the subject 102 may be filtered to acquire the pulse variations of the subject 102 as a function of time. In some embodiments, this filtering can be expressed as:

$$I_1(t) = DC + AC \cdot \sin(f \cdot t + \propto),$$

where $I_1$ is the intensity of light 108 of the first wavelength range reflected from the skin 110 of the subject 102, DC is the direct current component of the intensity of light 108 of the first wavelength range reflected from the skin 110 of the subject 102, AC is the alternating current component of the intensity of light 108 of the first wavelength range reflected from the skin 110 of the subject 102, f is the frequency of the pulsation caused by the heart beat of the subject 102 (which is around 1 Hz), t is time, and $\propto$ is a phase angle of a signal representative of the heart beat of the subject 102 with respect to a reference signal. The pulse amplitude or pulse modulation (PM) may then be determined as the ratio of the measurements of the alternating current (AC) component and the direct current (DC) component, which can be expressed as:

$$PM = \frac{AC}{DC}.$$

At block 206 of FIG. 4, the determined pulse amplitudes are analyzed to determine the blood pressure of the subject 102. For example, the pulse amplitude or pulse modulation (PM) is a function of the force F at which the light sensor 106 is applied to the skin 110 of the subject 102, i.e. PM=PM(F). Thus, in some embodiments, the determined pulse amplitudes may be analyzed by integrating this function for force F to determine the blood pressure BP of the subject 102, e.g. according to the following formula:

$$BP = C \int_0^{F_{max}} PM(F) dF,$$

where C is a calibration constant. The calibration constant may, for example, be determined by large scale data analysis. The calibration constant C may, for example, have a value of 200 mHg/(0.01*2000N)=10 mmHg/N. In some embodiments, the calibration constant may be stored in a memory. As mentioned earlier, the apparatus 100 may comprise the memory according to some embodiments or the memory may be external to (i.e. separate to or remote from) the apparatus 100 according to other embodiments.

At block 206 of FIG. 4, the determined pulse amplitudes can be analyzed to determine any one or more of a systolic blood pressure measurement for the subject 102 and a diastolic blood pressure measurement for the subject 102. The determined pulse amplitudes are analyzed to determine the systolic blood pressure measurement for the subject 102 based on the applied force at which the determined pulse amplitude drops below a predefined threshold (e.g. significantly diminishes), an integral of the determined pulse amplitudes, or both the applied force at which the determined pulse amplitude drops below the predefined threshold and the integral of the determined pulse amplitudes. In some embodiments, the predefined threshold may be defined as a percentage. For example, in some embodiments, the systolic blood pressure measurement for the subject 102 may be determined based on the applied force at which the determined pulse amplitude drops by a predefined percentage (e.g. a percentage in a range from 30% to 60%) and/or an integral of the determined pulse amplitudes. Herein, the applied force at which the determined pulse amplitude drops below a predefined threshold is the applied force at which the determined pulse amplitude drops below the predefined threshold after a maximum peak in the pulse amplitude. Also, herein, the integral of the determined pulse amplitudes is with respect to the applied forces.

In some embodiments, the systolic blood pressure measurement for the subject 102 may be determined by comparing the applied force at which the determined pulse amplitude drops below a predefined threshold and/or an integral of the determined pulse amplitudes to a plurality of applied forces and/or integrals that are stored with corresponding systolic blood pressure measurements. In some embodiments, the plurality of applied forces and/or integrals and corresponding systolic blood pressure measurements may be stored in the form of a table (e.g. a look-up table). The plurality of applied forces and/or integrals and corresponding systolic blood pressure measurements may be stored in a memory, such as that mentioned earlier.

In some embodiments, the systolic blood pressure measurement for the subject 102 may be determined based on the applied force at which the determined pulse amplitude drops below a predefined threshold by multiplying the applied force at which the determined pulse amplitude drops below the predefined threshold with gravitational acceleration (i.e. 9.8 m/s$^2$) and dividing by an area of the skin to which the force is applied to obtain a value for the applied pressure, which can then be converted into a blood pressure value. This blood pressure value is then the determined systolic blood pressure measurement for the subject. In some embodiments, the area of the skin to which the force is applied may be determined by calibration. An example value for the area may be 1 cm$^2$.

In some embodiments, the systolic blood pressure measurement for the subject 102 may be determined based on an integral of the determined pulse amplitudes by calculating the value of the integral of the pulse amplitudes and comparing the calculated integral value to a plurality of integral values stored in a memory (such as that mentioned earlier) with corresponding systolic blood pressure measurements. In some embodiments, the plurality of integral values and corresponding systolic blood pressure measurements may be stored in the form of a table (e.g. a look-up table). The integral of the determined pulse amplitudes can comprise the area under a line (or curve) plotted through the pulse amplitudes. The determined pulse amplitudes are analyzed to determine the diastolic blood pressure measurement based on the applied force at which an initial rise in the determined pulse amplitude is identified. Herein, the applied force at which the initial rise in the determined pulse amplitude is identified is the applied force at which the initial rise in the determined pulse amplitude is identified before a maximum peak in the pulse amplitude. The initial rise in the determined pulse amplitude is the rise in the determined pulse amplitude that occurs before a subsequent fall in the determined pulse amplitude. In some embodiments, the initial rise in the determined pulse amplitude may be defined as a predefined threshold. For example, in some embodiments, the diastolic blood pressure measurement may be determined based on the applied force at which the determined pulse amplitude is identified to reach the predefined threshold. Herein, the applied force at which the determined pulse amplitude reaches a predefined threshold is the applied force at which the determined pulse amplitude reaches the predefined threshold before a maximum peak in the pulse amplitude.

In some embodiments, the predefined threshold may be defined as a percentage. Thus, in some embodiments, the initial rise in the determined pulse amplitude may be defined as a percentage. For example, in some embodiments, the diastolic blood pressure measurement may be determined based on the applied force at which the determined pulse amplitude is identified to be a predefined percentage (e.g. a percentage in a range from 30% to 60%) of the highest value of the pulse amplitude before the beginning of the fall. In some embodiments, the initial rise in the determined pulse amplitude may be the highest value of the pulse amplitude before the beginning of the fall. The initial rise in the determined pulse amplitude is caused by occlusion.

In some embodiments, the diastolic blood pressure measurement for the subject 102 may be determined based on the applied force at which the determined pulse amplitude reaches a predefined threshold by multiplying the applied force at which the determined pulse amplitude reaches the predefined threshold with gravitational acceleration (i.e. 9.8 m/s$^2$) and dividing by an area of the skin to which the force is applied to obtain a value for the applied pressure, which can then be converted into a blood pressure value. This blood pressure value is then the determined diastolic blood pressure measurement for the subject. In some embodiments, the area of the skin to which the force is applied may be determined by calibration. An example value for the area may be 1 cm$^2$.

In some embodiments, the diastolic blood pressure measurement for the subject 102 may be determined by comparing the applied force at which an initial rise in the determined pulse amplitude occurs to a plurality of applied forces stored with corresponding diastolic blood pressure measurements. In some embodiments, the plurality of applied forces and corresponding diastolic blood pressure measurements may be stored in the form of a table (e.g. a look-up table). The plurality of applied forces and corresponding diastolic blood pressure measurements may be stored in a memory, such as that mentioned earlier.

In some embodiments, the processor 104 of the apparatus 100 may be configured to plot the determined pulse amplitude as a function of the range of forces at which the light sensor 106 is applied to the skin 110 of the subject 102. In these embodiments, the processor 104 of the apparatus 100 can be configured to analyze the plot to determine any one or more of the systolic blood pressure measurement (based on the applied force at which the determined pulse amplitude drops below a predefined threshold and/or the integral of the determined pulse amplitudes) and the diastolic blood pressure measurement (based on the applied force at which the initial rise in the determined pulse amplitude is identified).

Figure 5:
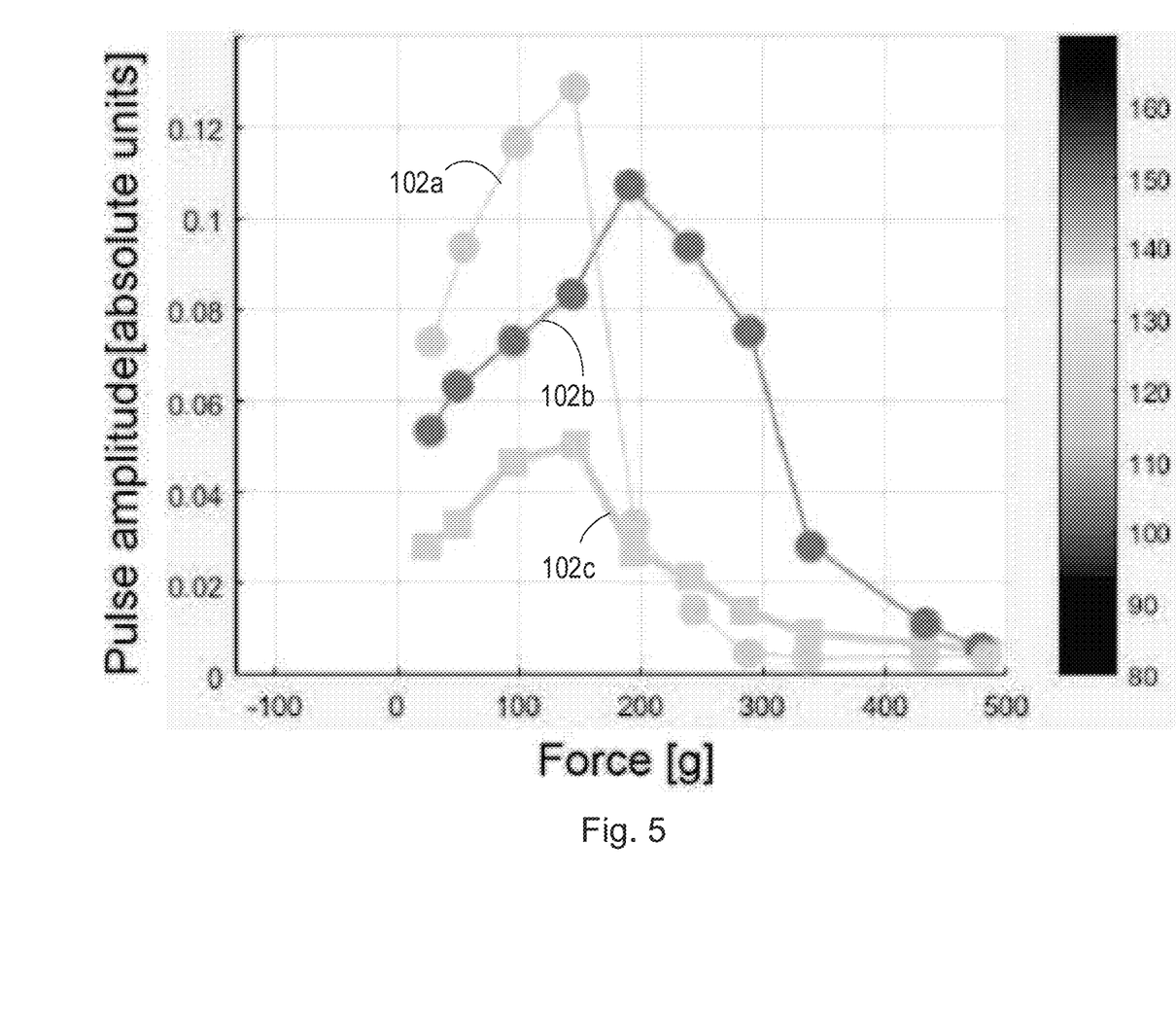
FIG. 5 is an illustration of pulse amplitudes determined from measurements of an intensity of light reflected from the skin of a subject for a range of forces at which a light sensor is applied to the skin of the subject according to an embodiment.

FIG. 5 is an example illustration of such a plot. In more detail, FIG. 5 is an illustration of the pulse amplitudes determined from measurements of an intensity of light reflected from the skin 110 of three different subjects 102a, 102b, 102c for a range of forces at which a light sensor 106 is applied to the skin 110 of those subjects 102a, 102b, 102c according to an embodiment. More specifically, FIG. 5 is an illustration of pulse amplitudes determined from measurements of an intensity of light 108 of a first wavelength range reflected from the skin 110 of each of the subjects 102a, 102b, 102c for the range of forces. The vertical axis of FIG.

5 is the pulse amplitude determined from measurements of the intensity of light reflected from the skin 110 of each of the subjects 102a, 102b, 102c. In this example illustration, the light 108 is of the green wavelength range at 550 nm. The horizontal axis of FIG. 5 is the force at which the light sensor 106 is (or the load) applied to the skin 110 of the subjects 102a, 102b, 102c.

The plot illustrated in FIG. 5 can be analyzed to determine the systolic blood pressure measurement based on the applied force at which the determined pulse amplitude drops below a predefined threshold and/or the integral of the determined pulse amplitudes. For example, in the plot of FIG. 5, the pulse amplitude determined in respect of the subject 102b drops below a predefined threshold at a force of approximately 300 g. This value of 300 g and/or the integral of the determined pulse amplitudes may thus be used in determining the systolic blood pressure in the manner described earlier. The integral of the determined pulse amplitudes can comprise the area under the plot.

In an example, with reference to FIG. 5 and assuming the predefined threshold of the pulse amplitude in respect of the systolic blood pressure determination is 80% (on the slope after the maximum peak), the applied force at which the determined pulse amplitude drops below the predefined threshold is 150 g for the first subject 102a, 250 g for the second subject 102b, and 150 g for the third subject 102c. The applied force at which the determined pulse amplitude drops below the predefined threshold may be multiplied by gravitational acceleration (i.e. 9.8 m/s$^2$) to provide a force of 1.5N for the first subject 102a, 2.5N for the second subject 102b, and 1.5N for the third subject 102c. This force may be divided by an area of the skin to which the force is applied to determine a value for the applied pressure. Assuming that the value for the area is 1 cm$^2$, the applied pressure is determined to be 0.15 bars for the first subject 102a, 0.25 bars for the second subject 102b, and 0.15 bars for the third subject 102c. This applied pressure may then be converted into a blood pressure value to determine the systolic blood pressure measurement as 113 mmHg for the first subject 102a, 188 mmHg for the second subject 102b, and 113 mmHg for the third subject 102c.

In another example, with reference to FIG. 5, the integral of pulse amplitudes for the first subject 102a is about (10*0.02*100 g), which is 20 g. Similarly calculated, the integral of pulse amplitudes for the second subject 102b is 28 g and the integral of pulse amplitudes for the third subject 102c is 14 g. These integral values are compared to a plurality of integral values stored in a memory (such as that mentioned earlier) with corresponding systolic blood pressure measurements. For example, the plurality of integral values may be stored with corresponding systolic blood pressure measurements in the form of a table, which may include the following values (e.g. along with others not illustrated):

| Integral value (g) | Blood pressure value (mmHg) |
| --- | --- |
| 14 | 120 |
| 20 | 150 |
| 28 | 200 |

Thus, the systolic blood pressure measurement is determined to be 150 mmHg for the first subject 102a, 200 mmHg for the second subject 102b, and 120 mmHg for the third subject 102c.

Alternatively or in addition, the plot illustrated in FIG. 5 can be analyzed to determine the diastolic blood pressure measurement based on the applied force at which the initial rise in the determined pulse amplitude is identified. For example, in the plot of FIG. 5, initial rise in the determined pulse amplitude of the subject 102b may be identified at a force of approximately 180 g. This value of 180 g may thus be used in determining the diastolic blood pressure in the manner described earlier. The color of the line for each subject 102a, 102b, 102c provides an indication of their determined blood pressure based on the color chart shown on the right of FIG. 5.

In an example, with reference to FIG. 5 and assuming the predefined threshold of the pulse amplitude in respect of the diastolic blood pressure determination is 80% (on the slope before the maximum peak), the applied force at which the determined pulse amplitude reaches the predefined threshold is 75 g for the first subject 102a, 125 g for the second subject 102b, and 75 g for the third subject 102c. The applied force at which the determined pulse amplitude reaches the predefined threshold may be multiplied by gravitational acceleration (i.e. 9.8 m/s$^2$) to provide a force of 0.75N for the first subject 102a, 1.25N for the second subject 102b, and 0.75N for the third subject 102c. This force may be divided by an area of the skin to which the force is applied to determine a value for the applied pressure. Assuming that the value for the area is 1 cm$^2$, the applied pressure is determined to be 0.075 bars for the first subject 102a, 0.125 bars for the second subject 102b, and 0.075 bars for the third subject 102c. This applied pressure may then be converted into a blood pressure value to determine the diastolic blood pressure measurement as 57 mmHg for the first subject 102a, 94 mmHg for the second subject 102b, and 57 mmHg for the third subject 102c.

Although not illustrated in FIG. 4, in some embodiments, the method 200 may further comprise acquiring, from the light sensor 106, measurements of an intensity of light 112 of the second wavelength range reflected from the skin 102 of the subject 110 for the range of forces at which the light sensor 106 is applied to the skin 110 of the subject 102. More specifically, the processor 104 may be further configured to acquire, from the light sensor 106, measurements of the intensity of light 112 of the second wavelength range reflected from the skin 102 of the subject 110 for the range of forces at which the light sensor 106 is applied to the skin 110 of the subject 102. In some of these embodiments, the processor 104 can be configured to normalize the acquired measurements of the intensity of light 108 of the first wavelength range using the intensity of light 112 of the second wavelength range. In some of the embodiments involving normalization, the processor 104 may be configured to determine the pulse amplitude from the normalized measurements of light intensity at the range of applied forces. By using light of a second wavelength range and normalizing in this way, the blood pressure measurements determined for the subject 102 by analyzing the determined pulse amplitudes can be corrected for the skin color of the person. This correction is possible since the intensity of light 112 of the second wavelength range may also change as a function of the force at which the light sensor 106 is applied to the skin 110 of the subject 102, but the change is not identical (e.g. in amplitude and/or trend) to the change in the intensity of light 108 of the first wavelength range.

Figure 6A:
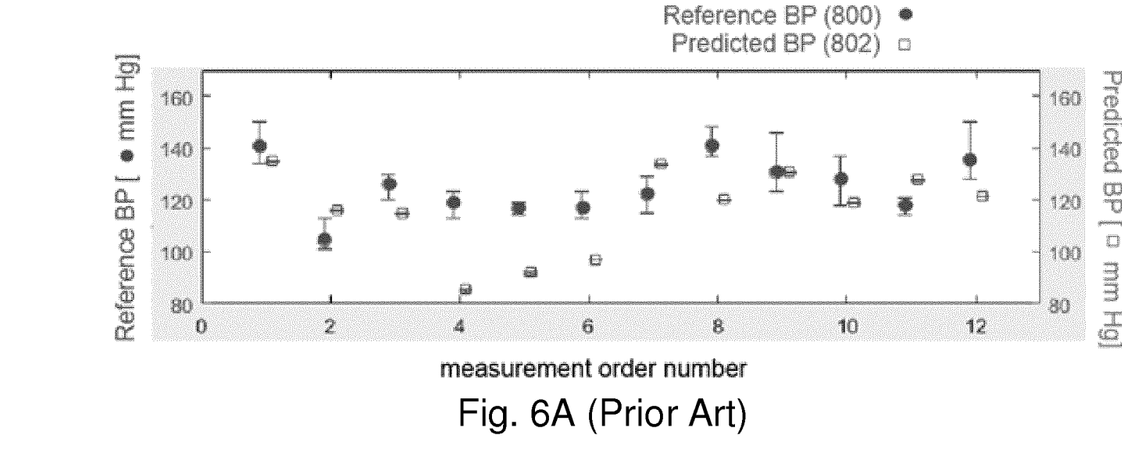
FIGS. 6A-B are illustrations of blood pressure measurements determined for a subject using an existing technique and using an apparatus described herein compared to reference blood pressure measurements according to an embodiment.
Figure 6B:
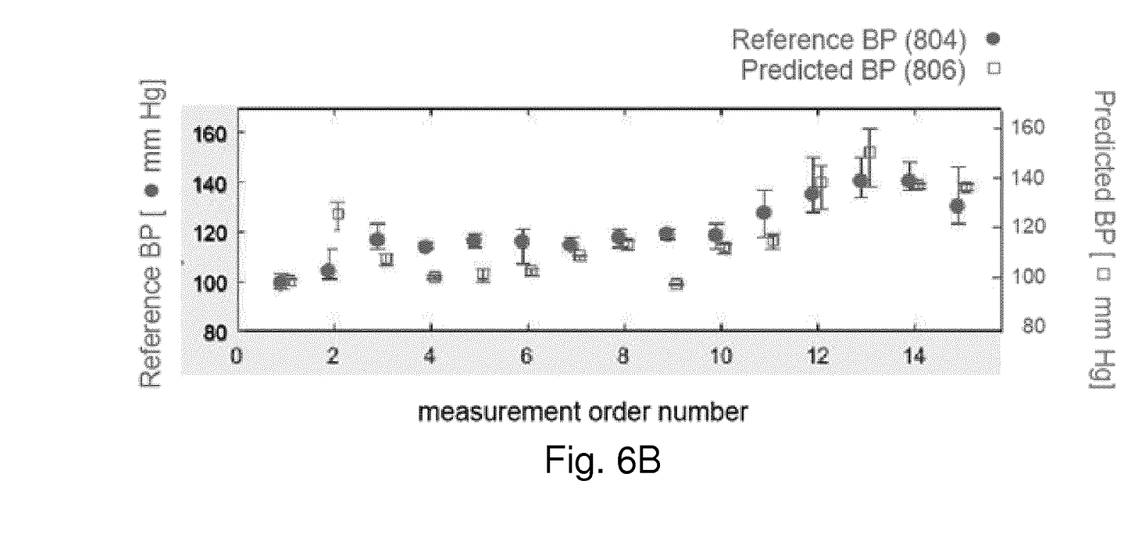

FIG. 6A is an illustration of blood pressure measurements determined for a subject 102 using an existing technique (which are labelled as 802) compared to reference blood pressure measurements (which are labelled as 800). The existing technique is that which involves a wearable cuff inflated around a finger of the subject 102 where an infrared photoplethysmogram (PPG) signal is monitored to determine the blood pressure measurements. FIG. 6B is an illustration of blood pressure measurements determined for a subject 102 using the apparatus 100 and method 200 described earlier with reference to FIG. 4 according to an embodiment (which are labelled as 806) compared to reference blood pressure measurements (which are labelled as 804). More specifically, the blood pressure measurements of FIG. 6A and FIG. 6B are systolic blood pressure measurement. The reference blood pressure measurements can be acquired from any other technique, e.g. the previously mentioned technique that involves inflation of a wearable cuff around a part of the body of the subject to acquire blood pressure measurements.

As illustrated in FIG. 6A and FIG. 6B, overall, the blood pressure measurements 806 determined for a subject 102 using the apparatus 100 and method 200 described earlier with reference to FIG. 4 more closely match the reference blood pressure measurements 804 than the blood pressure measurements 802 determined for a subject 102 using the existing technique match the reference blood pressure measurements 800. Although the blood pressure measurements 806 determined for a subject 102 using the apparatus 100 and method 200 described earlier with reference to FIG. 4 still has outliers, it can be seen from FIGS. 6A and 6B that the apparatus 100 and method 200 described earlier with reference to FIG. 4 provides an improved correlation than the existing technique. Thus, the apparatus 100 and method 200 described earlier with reference to FIG. 4 provides more accurate and reliable blood pressure measurements.

There is also provided a computer program product comprising a computer readable medium. The computer readable medium has computer readable code embodied therein. The computer readable code is configured such that, on execution by a suitable computer or processor, the computer or processor is caused to perform any of the methods described herein. The computer readable medium may be, for example, any entity or device capable of carrying the computer program product. For example, the computer readable medium may include a data storage, such as a ROM (such as a CD-ROM or a semiconductor ROM) or a magnetic recording medium (such as a hard disk). Furthermore, the computer readable medium may be a transmissible carrier, such as an electric or optical signal, which may be conveyed via electric or optical cable or by radio or other means. When the computer program product is embodied in such a signal, the computer readable medium may be constituted by such a cable or other device or means. Alternatively, the computer readable medium may be an integrated circuit in which the computer program product is embedded, the integrated circuit being adapted to perform, or used in the performance of, the method described herein.

There is thus provided herein an improved apparatus and method for determining a blood pressure measurement for a subject.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for determining a blood pressure measurement for a subject, the apparatus comprising a processor configured to:
   acquire, from a light sensor, measurements of an intensity of light of a first wavelength range reflected from skin of the subject for a range of forces at which the light sensor is applied to skin of the subject;
   determine a pulse amplitude of a pulse of the subject from the measurements of light intensity at the range of applied forces; and
   measure a systolic blood pressure of the subject based on an applied force within the range of applied forces at which the determined pulse amplitude drops below a predefined threshold and an integral of the determined pulse amplitude as a function of applied force.

2. The apparatus as claimed in claim 1, wherein:
   the acquired measurements of the intensity of light of the first wavelength range comprise measurements of an alternating current component and a direct current component of the intensity of light of the first wavelength range reflected from the skin of the subject; and
   the processor is further configured to determine the pulse amplitude as a ratio of the measurements of the alternating current component and the direct current component,
   wherein the alternating current component of the intensity of light of the first wavelength range reflected from the skin of the subject decreases as the applied force at which the light sensor is applied to the skin of the subject increases, and
   wherein the direct current component of the intensity of light of the first wavelength range reflected from the skin of the subject increases as the applied force at which the light sensor is applied to the skin of the subject increases.

3. The apparatus as claimed in claim 1, wherein the first wavelength range is a wavelength range from 495 nm to 570 nm.

4. The apparatus as claimed in claim 1, wherein the processor is further configured to:
   acquire, from the light sensor, measurements of an intensity of light of a second wavelength range reflected from the skin of the subject for the range of applied forces at which the light sensor is applied to the skin of the subject, wherein the second wavelength range is different to the first wavelength range;
   normalize the acquired measurements of the intensity of light of the first wavelength range using the intensity of light of the second wavelength range; and
   determine the pulse amplitude from the normalized measurements of light intensity at the range of applied forces.

5. The apparatus as claimed in claim 4, wherein the second wavelength range is a wavelength range from 620 nm to 700 nm or a wavelength range from 700 nm to 1 mm.

6. The apparatus as claimed in claim 1, wherein the processor is further configured to:

measure a diastolic blood pressure of the subject based on an applied force within the range of applied forces at which an initial rise in the determined pulse amplitude is identified.

7. The apparatus as claimed in claim 6, wherein the processor is further configured to:
determine, from a plot the determined pulse amplitude as a function of the range of applied forces at which the light sensor is applied to the skin of the subject:
the systolic blood pressure measurement based on the applied force at which the determined pulse amplitude drops below the predefined threshold and/or the integral of the determined pulse amplitude; and/or
the diastolic blood pressure measurement based on the applied force at which the initial rise in the determined pulse amplitude is identified.

8. A system for determining a blood pressure measurement for a subject, the system comprising:
a light sensor configured to acquire measurements of intensity of light of a first wavelength range reflected from skin of the subject for a range of forces at which the light sensor is applied to skin of the subject;
a processor coupled to the light sensor; and
a non-transitory memory storing instructions that, when executed by the processor, cause the processor to:
acquire the measurements of intensity of light of the first wavelength from the light sensor for the range of applied forces at which the light sensor is applied to the skin of the subject;
determine a pulse amplitude of a pulse of the subject from the measurements of light intensity of light at the range of applied forces; and
measure a systolic blood pressure of the subject based on an applied force within the range of applied forces at which the determined pulse amplitude drops below a predefined threshold and an integral of the determined pulse amplitude as a function of applied force.

9. The system as claimed in claim 8, wherein the light sensor is further configured to receive measurements of intensity of light of a second wavelength range, different from the first wavelength range, reflected from the skin of the subject for the range of applied forces at which the light sensor is applied to the skin of the subject.

10. The system as claimed in claim 9, wherein the instructions further cause the processor to:
normalize the acquired measurements of the intensity of light of the first wavelength range using the intensity of light of the second wavelength range; and
determine the pulse amplitude from the normalized measurements of light intensity at the range of applied forces.

11. The system as claimed in claim 10, further comprising:
a light source configured to emit light of the first wavelength range and the second wavelength range at the skin of the subject.

12. The system as claimed in claim 8, further comprising:
a light source configured to emit light of the first wavelength range at the skin of the subject.

13. The system as claimed in claim 8, further comprising: a force sensor configured to measure applied force within the range of applied forces at which the light sensor is applied to the skin of the subject.

14. The system as claimed in claim 8, further comprising:
an optical head contactable with the skin of the subject, wherein the optical head comprises the light sensor.

15. The system as claimed in claim 8, wherein the instructions further cause the processor to:
measure a diastolic blood pressure of the subject based on an applied force within the range of applied forces at which an initial rise in the determined pulse amplitude is identified.

16. A method for determining a blood pressure measurement for a subject, the method comprising:
acquiring, from a light sensor, measurements of an intensity of light of a first wavelength range reflected from skin of the subject for a range of forces at which the light sensor is applied to skin of the subject;
determining a pulse amplitude of a pulse of the subject from the measurements of light intensity at the range of applied forces; and
measuring a systolic blood pressure of the subject based on an applied force with the range of applied forces at which the determined pulse amplitude drops below a predefined threshold and an integral of the determined pulse amplitude as a function of applied force.

17. A non-transitory computer readable medium having computer readable code embodied therein, the computer readable code being configured such that, on execution by a computer or a processor, the computer or the processor is caused to perform the method as claimed in claim 16.

18. The method as claimed in claim 16, further comprising:
measuring a diastolic blood pressure of the subject based on an applied force within the range of applied forces at which an initial rise in the determined pulse amplitude is identified.

19. The method as claimed in claim 16, wherein the acquired measurements of the intensity of light of the first wavelength range comprise measurements of an alternating current component and a direct current component of the intensity of light of the first wavelength range reflected from the skin of the subject, the method further comprising:
determining the pulse amplitude as a ratio of the measurements of the alternating current component and the direct current component,
wherein the alternating current component of the intensity of light of the first wavelength range reflected from the skin of the subject decreases as the applied force at which the light sensor is applied to the skin of the subject increases, and
wherein the direct current component of the intensity of light of the first wavelength range reflected from the skin of the subject increases as the applied force at which the light sensor is applied to the skin of the subject increases.

20. The method as claimed in claim 16, further comprising:
acquiring, from the light sensor, measurements of an intensity of light of a second wavelength range reflected from the skin of the subject for the range of applied forces at which the light sensor is applied to the skin of the subject, wherein the second wavelength range is different to the first wavelength range;
normalizing the acquired measurements of the intensity of light of the first wavelength range using the intensity of light of the second wavelength range; and
determining the pulse amplitude from the normalized measurements of light intensity at the range of applied forces.

* * * * *